United States Patent
Park et al.

(10) Patent No.: US 8,059,175 B2
(45) Date of Patent: Nov. 15, 2011

(54) IMAGE CAPTURE DEVICE AND METHOD OF OPERATING THE SAME

(75) Inventors: Ju-Seop Park, Seoul (KR); Gun-Hee Han, Goyang-si (KR); Seog-Heon Ham, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 747 days.

(21) Appl. No.: 11/979,886

(22) Filed: Nov. 9, 2007

(65) Prior Publication Data
US 2008/0122961 A1    May 29, 2008

(30) Foreign Application Priority Data
Nov. 15, 2006   (KR) .................. 10-2006-0112968

(51) Int. Cl.
| | |
|---|---|
| *H04N 9/083* | (2006.01) |
| *H04N 3/14* | (2006.01) |
| *H04N 5/335* | (2011.01) |
| *H04N 9/04* | (2006.01) |

(52) U.S. Cl. ........ 348/276; 348/266; 348/272; 348/278; 348/294; 348/296; 250/208.1

(58) Field of Classification Search .......... 348/294–324, 348/266–283; 250/208.1
See application file for complete search history.

(56) References Cited

U.S. PATENT DOCUMENTS

| | | | |
|---|---|---|---|
| 4,504,854 A | 3/1985 | Masuda | |
| 4,760,441 A | 7/1988 | Kohno | |
| 5,018,006 A * | 5/1991 | Hashimoto | 348/275 |
| 5,121,192 A | 6/1992 | Kazui | |
| 6,122,007 A * | 9/2000 | Ishibashi | 348/231.6 |
| 6,529,236 B1 * | 3/2003 | Watanabe | 348/230.1 |
| 7,400,332 B2 * | 7/2008 | Schweng et al. | 345/589 |
| 7,671,316 B2 * | 3/2010 | Kanai et al. | 250/208.1 |
| 7,915,576 B2 * | 3/2011 | Kanai et al. | 250/226 |
| 7,952,623 B2 * | 5/2011 | Wada | 348/273 |
| 2004/0189844 A1 * | 9/2004 | McCaffrey et al. | 348/308 |
| 2007/0076269 A1 * | 4/2007 | Kido et al. | 358/474 |
| 2007/0132868 A1 * | 6/2007 | Lee et al. | 348/308 |

FOREIGN PATENT DOCUMENTS

| | | |
|---|---|---|
| JP | 01-147987 | 6/1989 |
| JP | 03-013192 | 1/1991 |
| JP | 07-307949 | 11/1995 |
| JP | 2004-304706 | 10/2004 |
| KR | 10-2007-0076804 A | 7/2007 |

* cited by examiner

*Primary Examiner* — Jason Chan
*Assistant Examiner* — Michael Osinski
(74) *Attorney, Agent, or Firm* — Lee & Morse, P.C.

(57) ABSTRACT

A method for operating an image capture device having a sensor with an array of first and second pixels includes capturing an image a plurality of times with the second pixels to produce a corresponding second image signal, the second pixels being white pixels, capturing the image a single time with the first pixels to produce a corresponding first image signal, inputting selecting signals to the sensor via a row driver to obtain the first and second image signals from the first and second pixels, respectively, and converting the first and second image signals to respective digital values via an analog-to-digital converter.

18 Claims, 5 Drawing Sheets

IMAGE CAPTURE DEVICE AND METHOD OF OPERATING THE SAME

BACKGROUND OF THE INVENTION

1. Field of the Invention

Embodiments of the present invention relate to an image capture device and a method of operating the same. More particularly, embodiments of the present invention relate to an image capture device having white pixels and exhibiting improved image readability and a method of operating the same.

2. Description of the Related Art

In general, image capture devices, e.g., digital cameras, mobile phone cameras, and so forth, may include image sensing devices, e.g., a complimentary metal oxide semiconductor (CMOS) image sensor, a charge-coupled device (CCD), and so forth, capable of capturing images in a form of image data, e.g., green (G), blue (B), and/or red (R) pixels. For example, a conventional image capture device may include a CMOS image sensor (CIS) with a Bayer color filter array (CFA), so that each pixel thereof may have a corresponding color filter to generate a G, B, and/or R color. More specifically, each pixel in the conventional CIS may detect a predetermined wavelength of light, and may convert the detected light into a corresponding electrical signal. However, a color filter of each conventional pixel may detect only a single color, i.e., only one-third of light incident on each conventional color filter may be sensed by the corresponding pixel, thereby causing poor color sensitivity.

Attempts have been made to improve color sensitivity by using white (W) pixels instead of G pixels. However, W pixels may absorb about three times more light than R, G, and/or B pixels, thereby reaching saturation, i.e., their photoelectric capacity, about three times faster. Once the W pixels are saturated, additional light incident on the W pixels may not be detected and/or converted to corresponding digital signals, by, e.g., an analog-to-digital converter, thereby causing information loss and/or reduced image readability.

SUMMARY OF THE INVENTION

Embodiments of the present invention are therefore directed to an image capture device and a method of operating the same, which substantially overcome one or more of the disadvantages of the related art.

It is therefore a feature of an embodiment of the present invention to provide an image capture device having white (W) pixels and exhibiting improved image readability.

It is another feature of an embodiment of the present invention to provide a method for operating an image capture device having W pixels and exhibiting improved image readability.

At least one of the above and other features and advantages of the present invention may be realized by providing a method for operating an image capture device having a sensor with an array of first and second pixels, the method including capturing an image a plurality of times with the second pixels to produce corresponding second image signals, the second pixels being white pixels, capturing the image a single time with the first pixels to produce corresponding first image signals, inputting selecting signals to the sensor via a row driver to output the first and second image signals from the first and second pixels, respectively, and converting the first and second image signals to respective digital values via an analog-to-digital converter.

Capturing the image a plurality of times with the second pixels may include capturing the image twice. Capturing the image with the second pixels twice may include capturing the image a first time over a first duration and capturing the image a second time over a second duration. Capturing the image over the first duration may include producing an unsaturated second image signal. Capturing the image with the first pixels may include capturing the image with red pixels and blue pixels over a third duration, the third duration being substantially equal to a sum of the first and second durations. Inputting the selecting signals to the sensor may include using the row drive to apply a single first selecting signal to the first pixels and two of second selecting signals to the second pixels. Inputting selecting signals to the sensor to output the first and second image signals may include outputting data corresponding only to a second of the two second selecting signals. Converting the first and second image signals may include using a correlated double sampling method.

At least one of the above and other features and advantages of the present invention may be further realized by providing an image capture device, including a sensor including an array of first and second pixels, the first pixels configured to capture an image a single time to produce corresponding first image signals and the second pixels configured to capture an image a plurality of times to produce corresponding second image signals, the second pixels being white pixels, a row driver electrically connected to the sensor, the row driver configured to input selecting signals to the first and second pixels, and an analog-to-digital converter configured to receive the first and second image signals from the sensor and to convert each of the first and second image signals to a respective digital value.

The first pixels may include red pixels and blue pixels. The sensor may include first lines having alternating red and white pixels and second lines having alternating blue and white pixels, the first and second lines being positioned in an alternating pattern. The sensor may include first pixels positioned in first rows and second pixels positioned in second rows, the red and blue pixels being positioned in an alternating pattern along a horizontal direction in each first row, and the first and second rows being positioned in an alternating pattern along a vertical direction.

The row driver may be configured to transmit a single first selecting signal to the first rows in a predetermined period of the time and a plurality of second selecting signals to the second rows in the predetermined period of the time. The row driver may be configured to generate a single first selecting signal and two of the second selecting signals in the predetermined period of the time. A duration of the first selecting signal may substantially equal a sum of durations of the two second selecting signals. Each of the second image signals may include data corresponding only to a second of the two second selecting signals.

Each pixel of the first and second pixels may include a pixel circuit and a bias circuit. The pixel circuit may include a first transistor connected to an output node and configured to receive a selecting signal from the row driver, a second transistor connected between a driving voltage and a sensing node, the second transistor configured to receiving a reset signal from the row driver, a third transistor connected between the driving voltage and the first transistor, the third transistor configured to receive a signal from the sensing node, and an optical device connected between a ground and the sensing node. The bias circuit may include a current source connected between the output node and the ground. The sensor may be a charge-coupled device.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
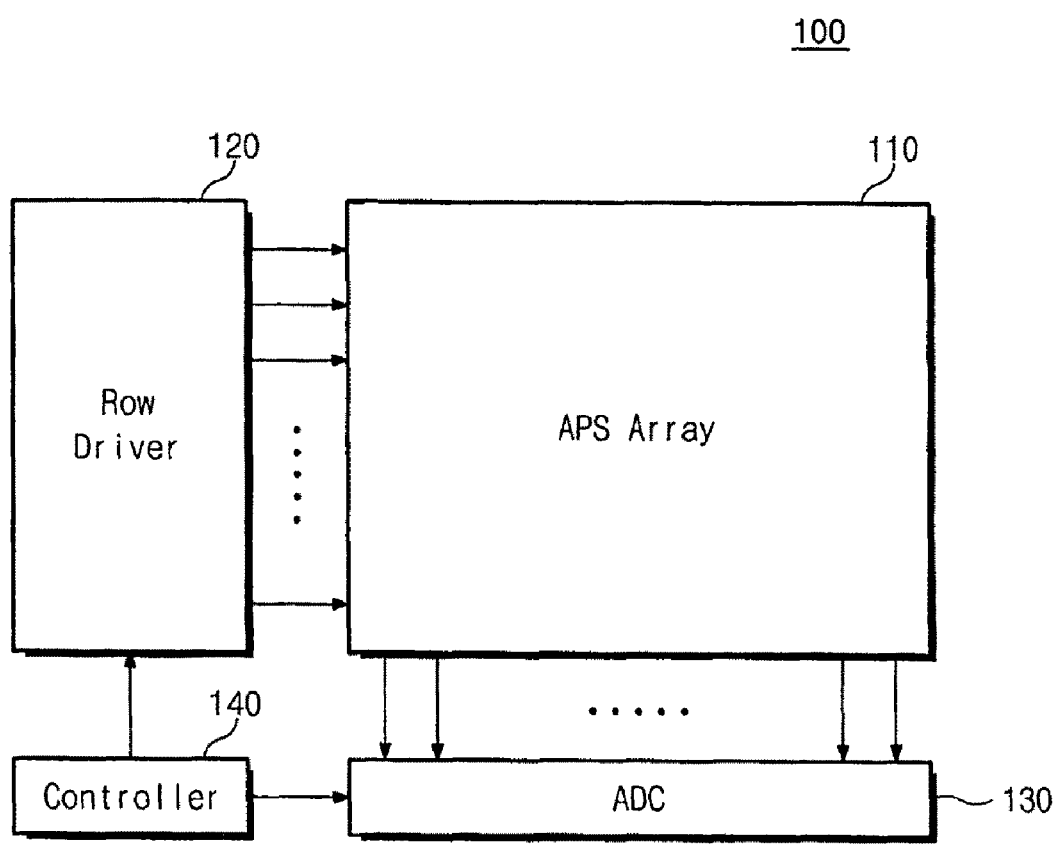
FIG. 1 illustrates a block diagram of an image capture device according to an embodiment of the present invention.

Korean Patent Application No. 10-2006-112968, filed on Nov. 15, 2006, in the Korean Intellectual Property Office, and entitled: "Image Capture Device", is incorporated by reference herein in its entirety.

Embodiments of the present invention will now be described more fully hereinafter with reference to the accompanying drawings, in which exemplary embodiments of the invention are illustrated. Aspects of the invention may, however, be embodied in different forms and should not be construed as limited to the embodiments set forth herein. Rather, these embodiments are provided so that this disclosure will be thorough and complete, and will fully convey the scope of the present invention to those skilled in the art.

In the figures, the dimensions of elements and regions may be exaggerated for clarity of illustration. It will also be understood that when an element is referred to as being "on" another element or substrate, it can be directly on the other element or substrate, or intervening elements may also be present. Further, it will be understood that when an element is referred to as being "connected to" another element, it can be connect directly to the other element, or one or more intervening elements may also be present. In addition, it will also be understood that when an element is referred to as being "between" two elements, it can be the only element between the two elements, or one or more intervening elements may also be present. Like reference numerals refer to like elements throughout.

Hereinafter, an image capture device according to an embodiment of the present invention will be described in more detail below with reference to FIGS. 1-3. Referring to FIG. 1, an image capture device 100 may include an active pixel sensor (APS) array 110, an analog-to-digital converter (ADC) 130, a row driver 120, and a controller 140.

The APS array 110 of the image capture device 100 may include a plurality of image sensors (not shown). The image sensors may include light receivers (not shown) that sense the intensity of light and color filters (not shown) for sensing color elements disposed above the image sensor. More specifically, the APS array 110 may include a plurality of pixels. Each pixel may detect light incident thereon via a photodiode (not shown), and may convert the detected light into a corresponding electrical signal. Each pixel of the APS array 110 may be driven by a unit pixel driving circuit 111, as will be explained in more detail below with respect to FIG. 3. The plurality of pixels of the APS array 110 may include a plurality of white (W) pixels, red (R) pixels, and blue (B) pixels. The W pixels refer hereinafter to pixels including no color filters, i.e., pixels transmitting all colors. The R and B pixels refer hereinafter to pixels including red and blue color filters, respectively, so only respective red and blue components of light incident thereon may be transmitted.

Figure 2:
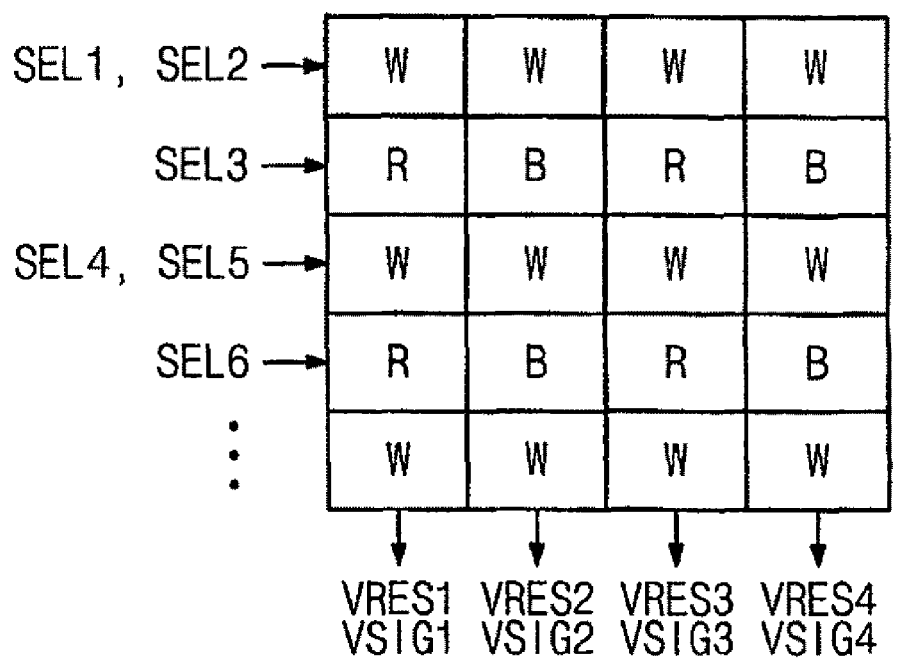
FIG. 2 illustrates a diagram of a pixel array of an image capture device according to an embodiment of the present invention.

Referring to FIG. 2, the APS array 110 may be include, e.g., W pixels in one line along a first direction and alternating R and B pixels in an adjacent line along the first direction. More specifically, a plurality of solely W pixels may be positioned to be adjacent to one another along the first direction, e.g., along a horizontal row. A plurality of alternating R and B pixels may be positioned in a line along the first direction, so that a B pixel may be positioned between two R pixels. As further illustrated in FIG. 2, the APS array 110 may have the lines of solely W pixels and lines of alternating R/B pixels arranged in a vertically alternating pattern along a second direction, e.g., a vertical column. Accordingly, each of the R and B pixels may be positioned between two W pixels along the second direction. The APS array 110 may include about 1 million pixels or more in order to increase image resolution in, e.g., mobile phone cameras, digital cameras, and so forth.

The ADC 130 of the image capture device 100 may be electrically connected to the APS array 110, so that analog signals generated in the APS array 110 may be converted into digital signals. More specifically, the photodiode in each pixel may be configured to detect incident light, and may convert the incident light into a respective electrical signal in order to generate a corresponding image signal, i.e., analog signals corresponding to R, W, or B colors. The analog image signals may be transmitted to the ADC 130 in order to generate a corresponding digital image signal. The generated digital image signals may be relayed from the ADC 130 to a digital signal processor (not shown). The ADC 130 may convert analog image signals into digital signals by, e.g., a correlated double sampling (CDS) method.

The row driver 120 of the image capture device 100 may be electrically connected to APS array 110, as illustrated in FIG. 1, in order to drive each horizontal row thereof. For example, as illustrated in FIG. 2, the row driver 120 may generate a selecting signal SEL, i.e., SEL1, SEL2, and so forth, for each horizontal row of the APS 110. Each pixel of the APS array 110 may generate a reset signal VRES and/or an image signal VSIG in response to the selecting signal SEL, as will be described in more detail below with respect to FIG. 3.

Figure 3:
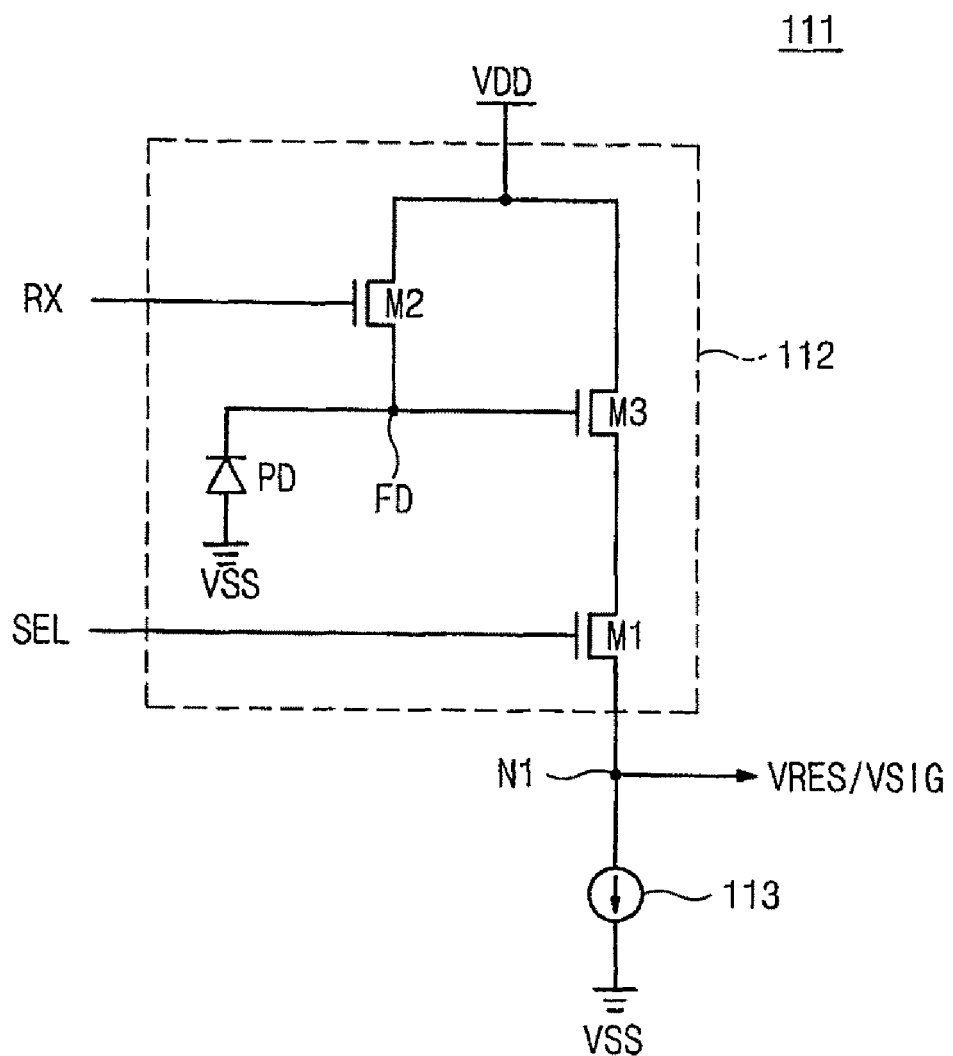
FIG. 3 illustrates a diagram of a pixel driving circuit of a pixel array according to an embodiment of the present invention.

Referring to FIG. 3, each unit pixel driving circuit 111 of the APS array 110 may include a pixel circuit 112 and a bias circuit 113. The pixel circuit 112 may include a first transistor M1, a second transistor M2, a third transistor M3, and an optical device, e.g., a diode, PD. The first through third transistors M1-M3 may be MOSFETs, e.g., NMOS transistors. A selecting signal SEL and a reset control signal RX may be input into every pixel circuit 112 by the row driver 120.

The first transistor M1 of the pixel circuit 112 may include a source connected to an output node N1 and a gate receiving an input select signal SEL from the row driver 120. The second transistor M2 of the pixel circuit 112 may include a drain connected to a driving voltage VDD, a source connected to a sensing node FD, and a gate receiving an input a reset control signal RX from the row driver 120. The third transistor M3 of the pixel circuit 112 may include a drain connected to the driving voltage VDD, a source connected to the drain of the first transistor M1, and a gate connected to the sensing node FD. The optical device PD of the pixel circuit 112 may be connected between a ground VSS and the sensing node FD.

The bias circuit 113 of the driving circuit 111 may be connected between the output node NI and the ground VSS, and may use a current source. The bias circuit 113 may be used for biasing the output node N1 of the pixel circuit 112, so output signals VRES/VSIG may be transmitted from the output node NI to the ADC 130. The bias circuit 113 may be connected, e.g., immediately below the pixel circuit 112, as illustrated in FIG. 3, and in close proximity to the APS array 110.

Operation of the unit pixel driving circuit 111 when converting an analog image signal to a digital image signal may be as follow. A selecting signal SEL may be input into the pixel circuit 112 by the row driver 120 to activate a corresponding pixel within a row of the APS array 110. Each activated pixel, i.e., a pixel receiving a SEL signal having a high logic input, may output a corresponding reset signal VRES and/or a corresponding image signals VSIG to the ADC 130, as illustrated in FIGS. 2-3. The image signals VSIG may be generated by the optical device PD with respect to detected light, and may be relayed to the ADC 130 to be converted to corresponding digital signals. The row driver 120 of the image capture device 100 may apply a selecting signal SEL, e.g., SEL1, SEL2, or SEL4, SEL5, and so forth, twice for each row of W pixels, and may apply a selecting signal SEL, e.g., SEL3 or SEL6, and so froth, once for each row of pixels containing R and B pixels, as further illustrated in FIG. 2. That is, two image capture operations may be performed for the W pixels. Accordingly, a single VSIG signal may correspond to two SEL signals input into the W pixels, i.e., only a VSIG signal corresponding to a second SEL signal of two SEL signals may be output to the ADC 130 to be converted into a digital signal.

More specifically, referring to FIG. 3, when the selecting signal SEL is in a logic high state, i.e., a logic input of "1", and the reset control signal RX is in a logic high state, the driving voltage VDD may be output through the sensing node FD to the source terminal of the third transistor M3, thereby outputting the reset signal VRES through a source terminal of the first transistor M1 to the ADC 130. When the selecting signal SEL is in a logic high state and the reset control signal RX is in a logic low state, i.e., a logic input of "0", the image signal VSIG photoelectrically generated by the optical device PD may be relayed through the sensing node FD and the source terminal of the first transistor M1 to the ADC 130. Each of the reset signals VRES, i.e., VRES1, VRES2, and so forth, and each of the image signals VSIG, i.e., VSIG1, VSIG2, and so forth, may be output in response to input of a respective selecting signal SEL. The reset signals VRES and image signals VSIG may be activated sequentially, and transmitted into the ADC 130.

The ADC 130 may receive the reset signals VRES and image signals VSIG, and may digitally convert and output a digital signal corresponding to a difference between the image signal VSIG and the output reset signal VRES. The converted digital signal may be output to the digital signal processor (not shown) to perform a predetermined interpolation. The digital signal processor may generate in response a driving signal suitable for driving a display device, e.g., a liquid crystal display (LCD), at a predetermined resolution.

The controller 140 of the image capture device 100 may be electrically connected to the row driver 120 and the ADC 130, as illustrated in FIG. 1. The controller 140 may generate timing control signals for controlling the row driver 120 and the ADC 130. More specifically, the controller 140 may control generation and timing of selecting signals SEL for rows of pixels of the APS array 110, and may control output of reset and image signals VRES/VSIG from the APS array 110 into the ADC 130. For example, the controller 140 may control generation and input of two selecting signals to the W pixels within a predetermined time period in order to capture an image twice.

Figure 4:
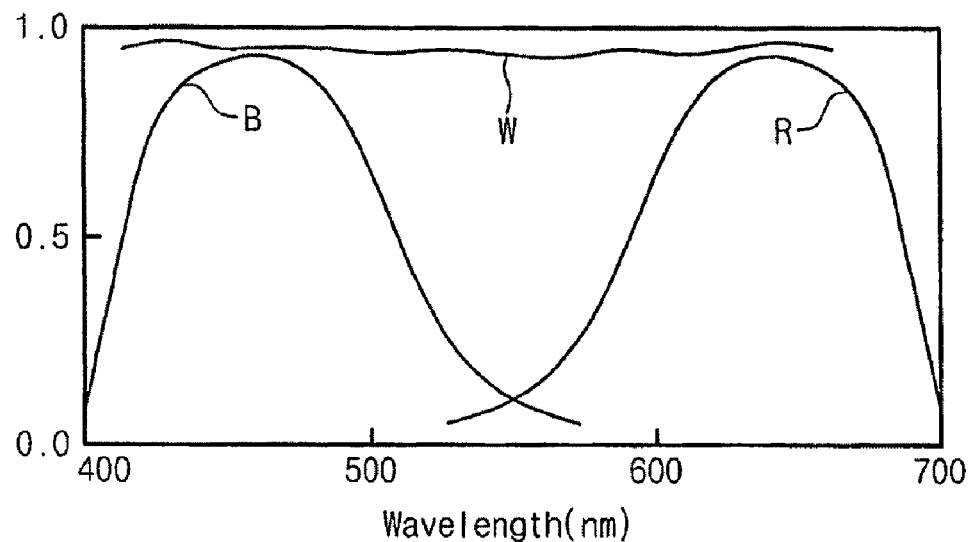
FIGS. 4-5 illustrate respective graphs of frequency and light intensity of red (R), blue (B), and white (W) pixels according to an embodiment of the present invention.
Figure 5:
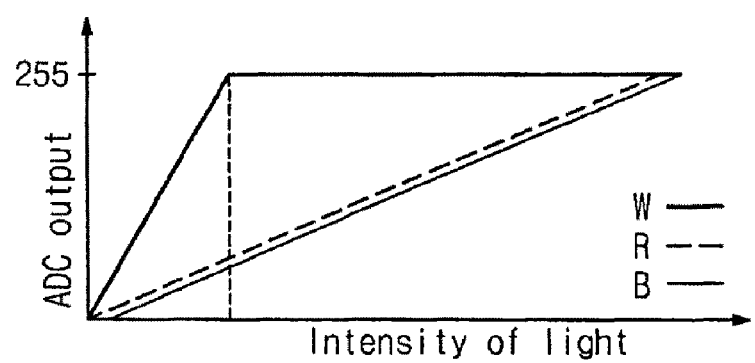

The image capturing device according to an embodiment of the present invention may be advantageous in providing two image capture operations for the W pixels. More specifically, as illustrated in FIG. 4, B pixels may have a normal distribution around a wavelength of about 450 nm, and R pixels may have a normal distribution around a wavelength of about 650 nm. The W pixels, on the other hand, may be evenly distributed across the entire visible wavelength range, thereby absorbing light in the entire visible wavelength range, as further illustrated in FIG. 4. Therefore, each W pixel may absorb light in an amount of about three times larger than an amount of light absorbed by each of the R and/or B pixels, thereby reaching saturation about three times faster than the R and/or B pixels, as illustrated in FIG. 5.

In order to improve detection and/or digital conversion of light subsequent to saturation of the W pixels, embodiments of the present invention may provide multiple image capturing with respect to the W pixels. That is, while R and B pixels may capture an image once in a predetermined period of time, i.e., one image per frame, W pixels may capture an image multiple times, e.g., at least twice, in the predetermined period of time, as will be described in more detail below with respect to FIG. 6. Accordingly, premature saturation of W pixels according to embodiments of the present invention may be substantially minimized and/or prevented.

Figure 6:
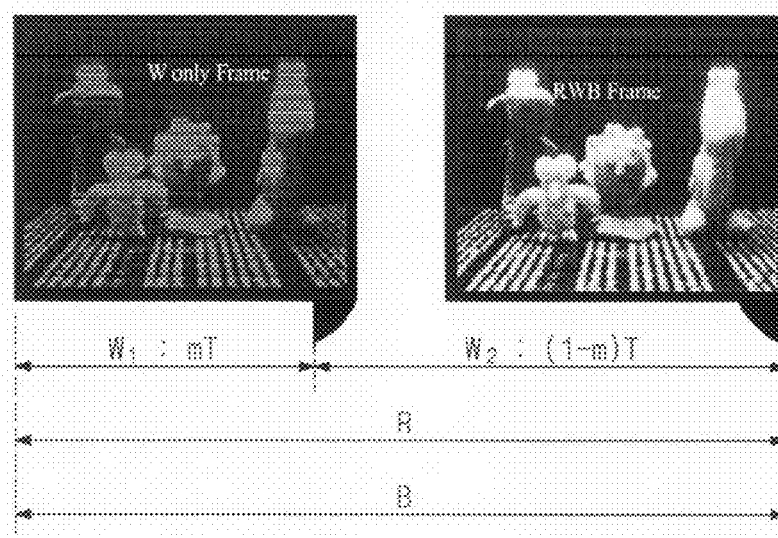
FIG. 6 illustrates a time diagram of image capturing by R, B, and W pixels according to an embodiment of the present invention.

For example, as illustrated in FIG. 6, a first image frame may be captured with a first W pixel W1 during a time period of about mT, and a second image frame may be captured with a second W pixel W2 during a time period of about (T−mT). Accordingly, during a time period T, i.e., a combined time period of mT and (T−mT), at least two images may be captured by the W pixels. In this respect, it should be noted that the time period mT may be sufficiently short to eliminate saturation of the W pixels. During the same time period T, as further illustrated in FIG. 6, a single frame image may be captured by each of the R and/or B pixels. In other words, while the R and/or B pixels may capture an image once over a predetermined time period, i.e., T, the W pixels may capture an image at least twice during a same predetermined time period.

Figure 7:
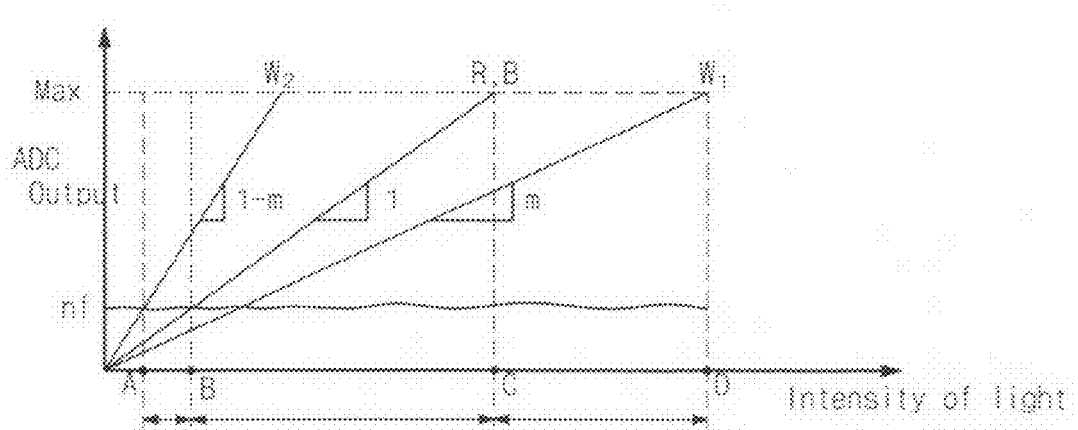
FIG. 7 illustrates a graph of a dynamic range of light intensity of an image capture device according to an embodiment of the present invention.

FIG. 7 illustrates a graph of an increased dynamic range of the image capture device 100 according to an embodiment of the present invention. In this respect, it is noted that a dynamic range hereinafter refers to a range of light detected by a pixel, i.e., a light intensity level above about a noise level and below about a saturation level of the pixel. Referring to FIG. 7, a dynamic range of light intensity of W pixels capturing an image once may be between about points B-C. However, the image capture device 100 according to embodiments of the present invention may increase that dynamic range of light intensity to be between points A-D, as illustrated in FIG. 7.

More specifically, the slopes in FIG. 7 represent respective proportions of image capture durations for each type of pixel, and nf represents noise including noise generated by the pixels. Accordingly, as can be seen in the graph of FIG. 7, a single W pixel may reach maximum saturation at point C. However, when light is detected in pixels W1 and W2, i.e., two frames of a same image are captured, some light may be absorbed in each of the pixels W1 and W2, thereby increasing the overall range of light intensity. In other words, the image captured above the nf noise level of the pixels W1 and W2 may extend between points A and D, even though W2 reaches saturation before W and W1 does not extend the nf noise level of the W pixels. The image capture device 100 may sense only signals greater than the nf noise level.

The image capture device 100 according to embodiments of the present invention may be advantageous in using W pixels to capture images a plurality of times, thereby substantially increasing a dynamic range of light intensity and sensitivity, as compared to conventional image capture device. Further, the image capture device 100 according to embodiments of the present invention may capture images multiple times using the W pixels, thereby preventing saturation of an image output to an ADC and improving image readability.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method for operating an image capture device having a sensor with an array of first and second pixels, the method comprising:
    capturing an image a plurality of times with the second pixels to produce corresponding second image signals, the second pixels being white pixels and being positioned only in second rows in the sensor;
    capturing the image a single time with the first pixels to produce corresponding first image signals, the first pixels being positioned only in first rows in the sensor;
    inputting selecting signals to the sensor via a row driver to output the first and second image signals from the first and second pixels, respectively; and
    converting the first and second image signals to respective digital values via an analog-to-digital converter, wherein:
    the row driver transmits a single first select signal to the first rows in a predetermined period of time and a plurality of second select signals to the second rows in the predetermined period of time.

2. The method as claimed in claim 1, wherein capturing the image a plurality of times with the second pixels includes capturing the image twice.

3. The method as claimed in claim 2, wherein capturing the image with the second pixels twice includes capturing the image a first time over a first duration and capturing the image a second time over a second duration.

4. The method as claimed in claim 3, wherein capturing the image over the first duration includes producing an unsaturated second image signal.

5. The method as claimed in claim 3, wherein capturing the image with the first pixels includes capturing the image with red pixels and blue pixels over a third duration, the third duration being substantially equal to a sum of the first and second durations.

6. The method as claimed in claim 1, wherein inputting the selecting signals to the sensor includes using the row driver to apply a single first selecting signal to the first pixels and two of second selecting signals to the second pixels.

7. The image capture device as claimed in claim 6, wherein inputting selecting signals to the sensor to output the first and second image signals includes outputting data corresponding only to a second of the two second selecting signals.

8. The method as claimed in claim 1, wherein converting the first and second image signals includes using a correlated double sampling method.

9. An image capture device, comprising:
    a sensor including an array of first and second pixels, the first pixels configured to capture an image a single time to produce corresponding first image signals and the second pixels configured to capture an image a plurality of times to produce corresponding second image signals, the second pixels being white pixels;
    a row driver electrically connected to the sensor, the row driver configured to input selecting signals to the first and second pixels; and
    an analog-to-digital converter configured to receive the first and second image signals from the sensor and to convert each of the first and second image signals to a respective digital value, wherein:
    the sensor includes first pixels positioned only in first rows second pixels positioned only in second rows, and
    the row driver is configured to transmit a single first select signal to the first rows in a predetermined period of time and a plurality of second select signals to the second rows in the predetermined period of time.

10. The image capture device as claimed in claim 9, wherein the first pixels include red pixels and blue pixels.

11. The image capture device as claimed in claim 10, wherein the red and blue pixels are positioned in an alternating pattern along a horizontal direction in each first row, and the first and second rows are positioned in an alternating pattern along a vertical direction.

12. The image capture device as claimed in claim 9 wherein the row driver is configured to generate the single first selecting signal and two of the second selecting signals in the predetermined period of the time.

13. The image capture device as claimed in claim 12, wherein a duration of the first selecting signal substantially equals a sum of durations of the two second selecting signals.

14. The image capture device as claimed in claim 12, wherein each of the second image signals includes data corresponding only to a second of the two second selecting signals.

15. The image capture device as claimed in claim 9, wherein each pixel of the first and second pixels includes a pixel circuit and a bias circuit.

16. The image capture device as claimed in claim 15, wherein the pixel circuit includes:
    a first transistor connected to an output node and configured to receive a selecting signal from the row driver;
    a second transistor connected between a driving voltage and a sensing node, the second transistor configured to receiving a reset signal from the row driver;
    a third transistor connected between the driving voltage and the first transistor, the third transistor configured to receive a signal from the sensing node; and
    an optical device connected between a ground and the sensing node.

17. The image capture device as claimed in claim 16, wherein the bias circuit includes a current source connected between the output node and the ground.

18. The image capture device as claimed in claim 9, wherein the sensor is a charge-coupled device.

* * * * *